June 24, 1958  M. L. BAXTER, JR  2,839,873
METHOD AND MACHINE FOR MAKING CURVED TOOTH GEARS
Filed July 22, 1950  7 Sheets-Sheet 1

INVENTOR.
MERIWETHER L. BAXTER, JR.
BY Richard W. Treverton
ATTORNEY

INVENTOR.
MERIWETHER L. BAXTER, JR.
BY
Richard W. Treverton
ATTORNEY

June 24, 1958 M. L. BAXTER, JR 2,839,873
METHOD AND MACHINE FOR MAKING CURVED TOOTH GEARS
Filed July 22, 1950 7 Sheets-Sheet 4

INVENTOR.
MERIWETHER L. BAXTER, JR.
BY
Richard W. Treverton
ATTORNEY

INVENTOR.
MERIWETHER L. BAXTER, JR.
ATTORNEY

June 24, 1958  M. L. BAXTER, JR  2,839,873
METHOD AND MACHINE FOR MAKING CURVED TOOTH GEARS
Filed July 22, 1950  7 Sheets-Sheet 6
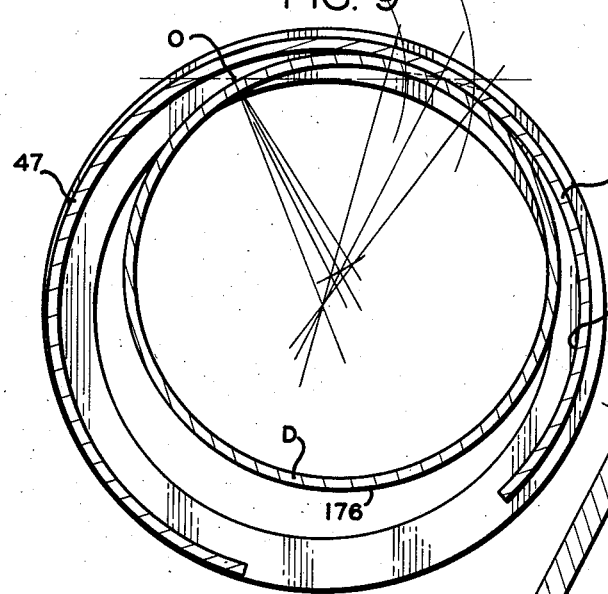
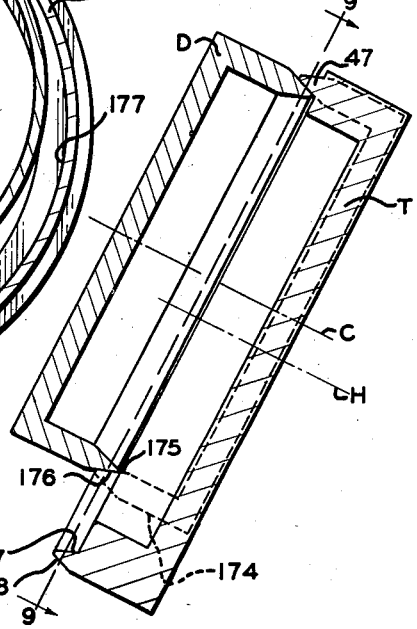
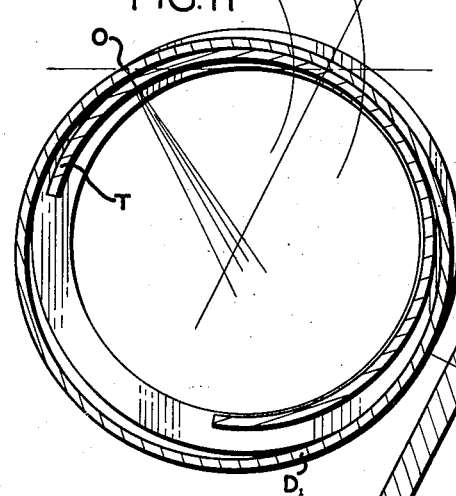
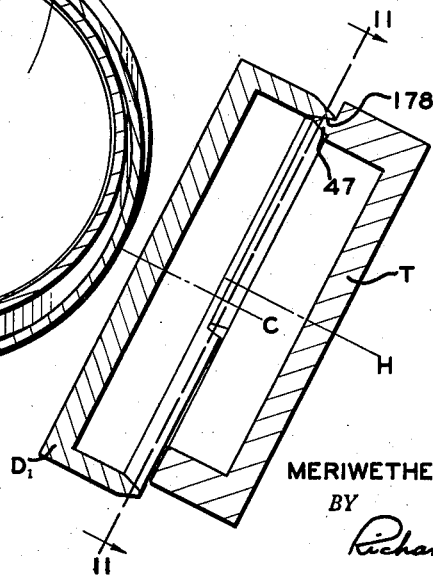
INVENTOR.
MERIWETHER L. BAXTER, JR.
BY
Richard W. Treverton
ATTORNEY INVENTOR.
MERIWETHER L. BAXTER, JR.
BY
Richard W. Treverton
ATTORNEY United States Patent Office 2,839,873
Patented June 24, 1958

2,839,873

METHOD AND MACHINE FOR MAKING CURVED TOOTH GEARS

Meriwether L. Baxter, Jr., Brighton, N. Y., assignor to The Gleason Works, Rochester, N. Y., a corporation of New York Application July 22, 1950, Serial No. 175,366

31 Claims. (Cl. 51—33)

This invention relates to a method and machine for producing, by continuous rotation of a gear blank and tool, curved tooth gears which may be identical in tooth shape with gears produced by existing methods involving indexing of the work after the completion of each tooth surface.

The method and machine are particularly applicable to the finishing of curved tooth bevel and hypoid gears, hereinafter sometimes collectively called "tapered gears," by grinding, shaving, lapping, and the like, and hence will usually be applied to work gears (the gears being produced) which have already been roughed, except in the case of fine pitches where the gears may advantageously be finished directly from solid blanks. For simplicity of disclosure the invention will be described primarily in connection with grinding, but it will be understood to embrace shaving, lapping, and other suitable finishing processes since it is not limited to a finishing tool having any one particular kind of abrasive surface or cutting edges.

In conventional generators for spiral bevel and hypoid gears a rotating annular cutter or abrasive wheel represents a tooth of a generating gear, sometimes a crown gear, which is rolled in mesh with the work gear to generate the teeth thereof. According to the present invention the tooth shape of the generating gear is profiled as a surface of revolution onto a wheel which in turn is employed to dress the rotating gear finishing tool. During this dressing operation the dressing wheel and the tool are rotated about their respective axes and are simultaneously rotated relative to each other about another axis, representing the axis of the generating gear, in such manner as to generate a spiral surface on the tool. After the dessing operation this spiral surface is brought into working engagement with the work gear; the tool is rotated about its axis in such timed relation with rotation of the work gear about its axis that the spiral surface engages successive tooth surfaces of the work gear and thus forms all of the gear teeth in one continuous operation.

It will be recognized that with the method just described the motions involved in producing the gear by means of the spiral surface of the finishing tool involves the same relative motions between the parts as those employed in producing the spiral surface on the tool with the dressing wheel; and hence if the work gear is of the same tooth number and is rotated, while it is being formed, on the same axis as the generating gear, its tooth form will be identical with that of the generating gear. In this way the present invention may be employed to produce, by continuous rotation of a spiral threaded tool and the work, non-generated gears which are identical in tooth shape with those produced by conventional circular cutters with methods involving indexing of the work after cutting each tooth surface.

In the production of generated gears by the present method, the same steps are followed as described hereinbefore for producing non-generated gears except that during the gear producing operation a generating roll is applied to the spiral threaded tool and to the work: the axis of the tool is slowly rotated about the axis of the generating gear, and a proportionate rotation is superimposed upon the rotation of the work about its axis. In this way there are generated, on the gears being produced, tooth profiles identical with those produced by gear generators employing intermittent indexing. During this generating process the tool and the work preferably make a large number of revolutions during which cuts are taken successively from each of the teeth, each cut representing a narrow band of contact progressing across the tooth surface and also progressing along the spiral thread of the tool. Hence the process has the inherent advantage that any error due to wheel wear and the like is distributed around the gear rather than building up between the first and last teeth to be cut as it may in methods involving intermittent indexing of the work. Also higher cutting time efficiencies are possible since the rotations of the work and of the finishing tool for tooth profile generation are continuous whereas with the usual intermittent indexing method the directions of these rotations must be reversed twice after each tooth surface is cut.

As is well known, both members of a pair of gears may be generated or only one member, in practice invariably the pinion, may be generated while the other member is non-generated. Because pinions produced by the present method may be identical with those made with circular cutters by conventional methods, there is the further advantage that they may be run with gears produced rapidly and hence at low cost with circular cutters by conventional non-generating methods.

A still further advantage is that members finished by the present invention, whether gears or pinions, can be roughed close to finished size on conventional circular-cutter machines because the tooth curvature may be the same. For this reason very little stock need be removed in the practice of the present invention, making possible rapid production and high precision.

The machine of the present invention includes, as do conventional bevel gear generating machines, an adjustable work head adapted to support a work gear for rotation, a cradle for adjustably supporting the finishing tool for rotation about its own axis and about the cradle axis (representing the axis of the generating gear), and suitable drive means for the work, the cradle and the finishing tool. The present machine further comprises an adjustable support for, and also drive means for, the dressing wheel; means for profiling the dressing wheel; and means for alternately presenting the work and the dressing wheel to the finishing tool. The last mentioned means conveniently takes the form of a slide movable on the base of the machine and carrying both the work head and the dressing wheel support.

The drive for the cradle is connected by a differential mechanism to the driving train which connects the finishing tool and the work. In this way a rotation corresponding to cradle rotation is superimposed upon that rotation of the work which keeps it in timed relation with the rotation of the spiral threaded finishing tool. The machine includes means for holding the work against rotation while the finishing tool is being dressed, so that the cradle will rotate through a predetermined definite angle for a given rotation of the finishing tool during the dressing operation.

The foregoing and other objects and advantages of the invention will appear from the following description made in connection with the drawings, wherein.

Figures 4, 14:
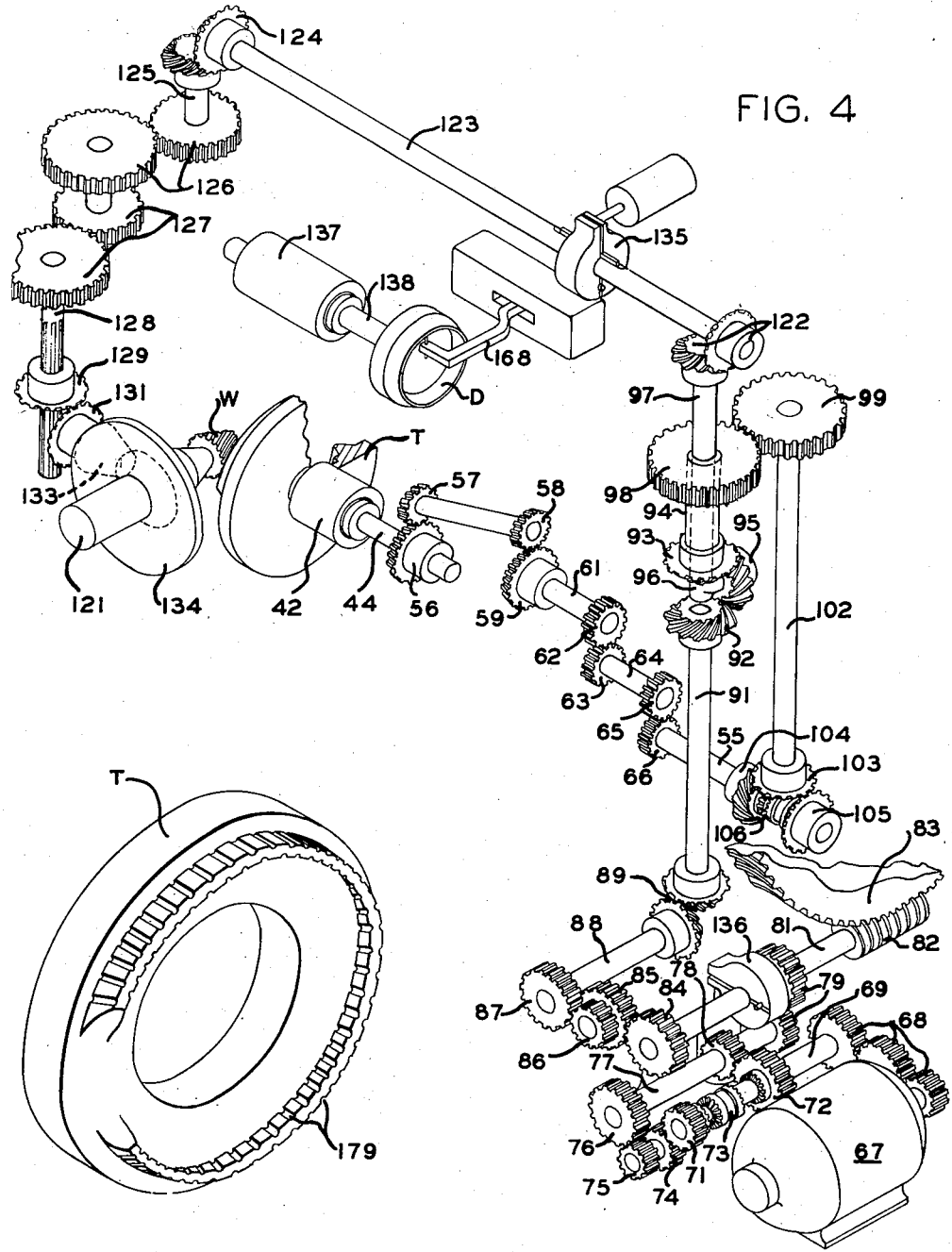
Fig. 4 is a drive diagram of the machine.
Figure 7:
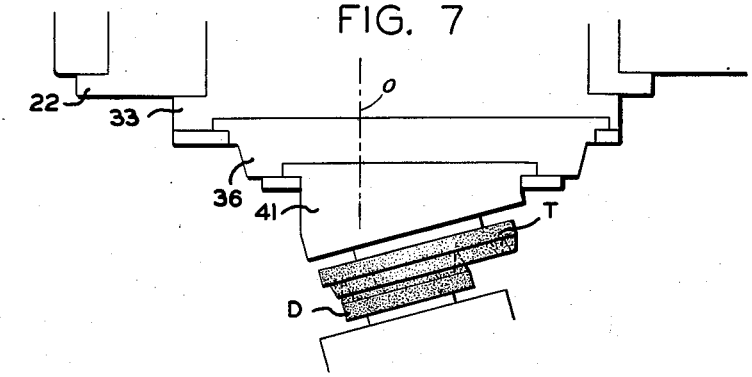
Figure 5:
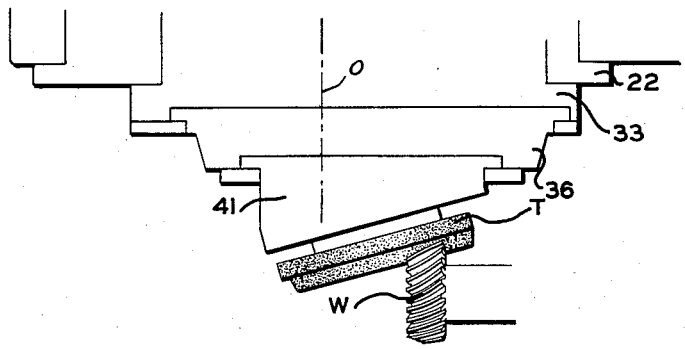
Figure 6:
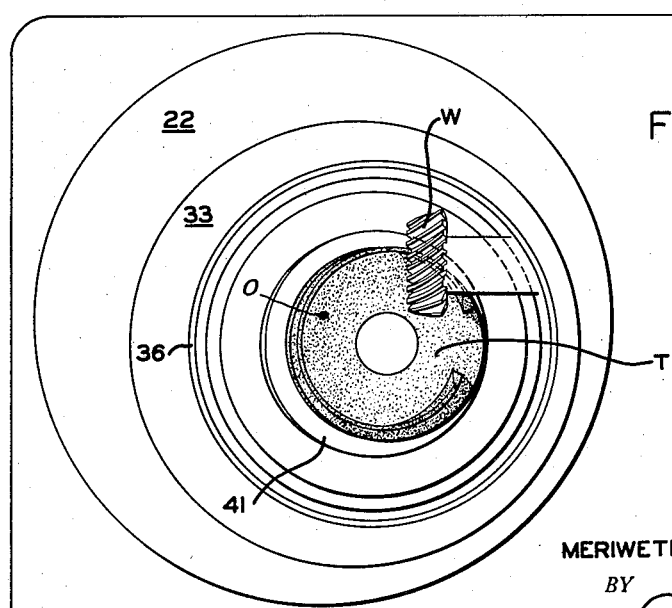
Figure 12:
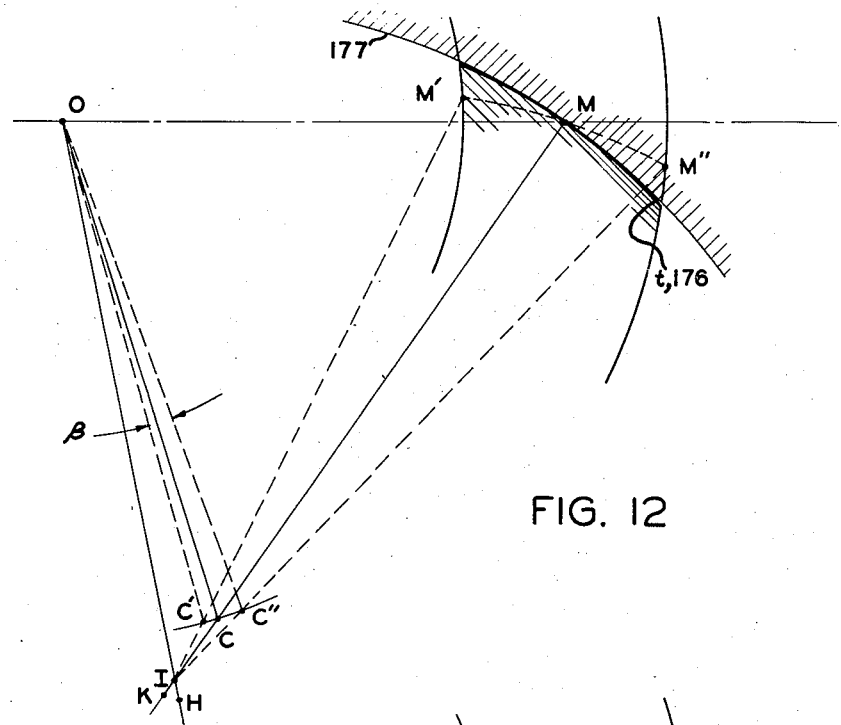
Figure 13:
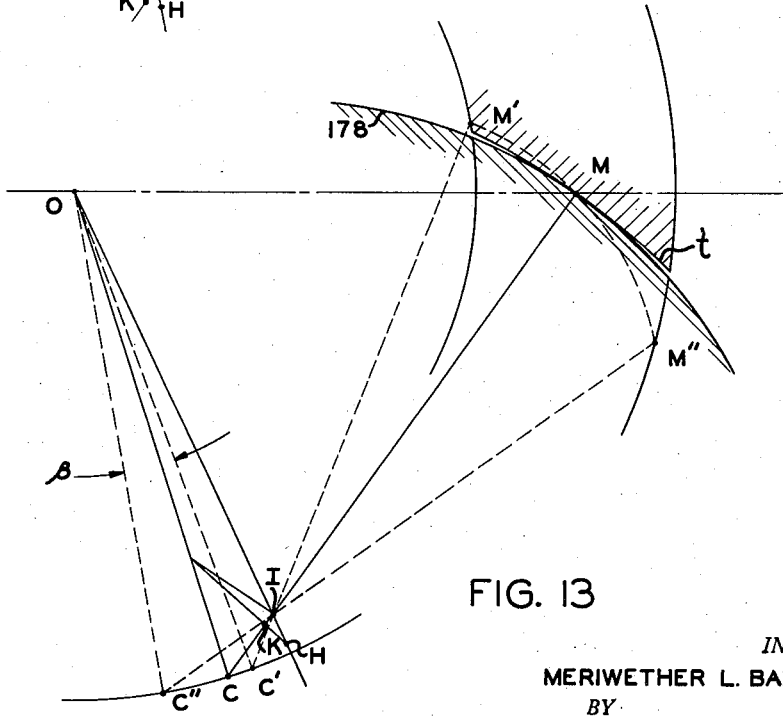

Figs. 5 and 6 respectively are plan and elevational views of the finishing tool engaged with a work gear;

Fig. 7 is a view similar to Fig. 5 but showing the finishing tool engaged with a dressing wheel;

Figs. 8 and 9 respectively are axial and transverse sectional views illustrating the relationship of spiral threaded finishing tool to a wheel for dressing the inside surface of the thread;

Figs. 10 and 11 are views similar to Figs. 8 and 9 but showing the relationship for dressing the outside surface of the thread;

Figs. 12 and 13 are diagrams illustrating the geometrical relationships in generating the inside and outside thread surfaces, respectively, and;

Fig. 14 is a perspective view of a modified form of finishing tool.

Figure 1:
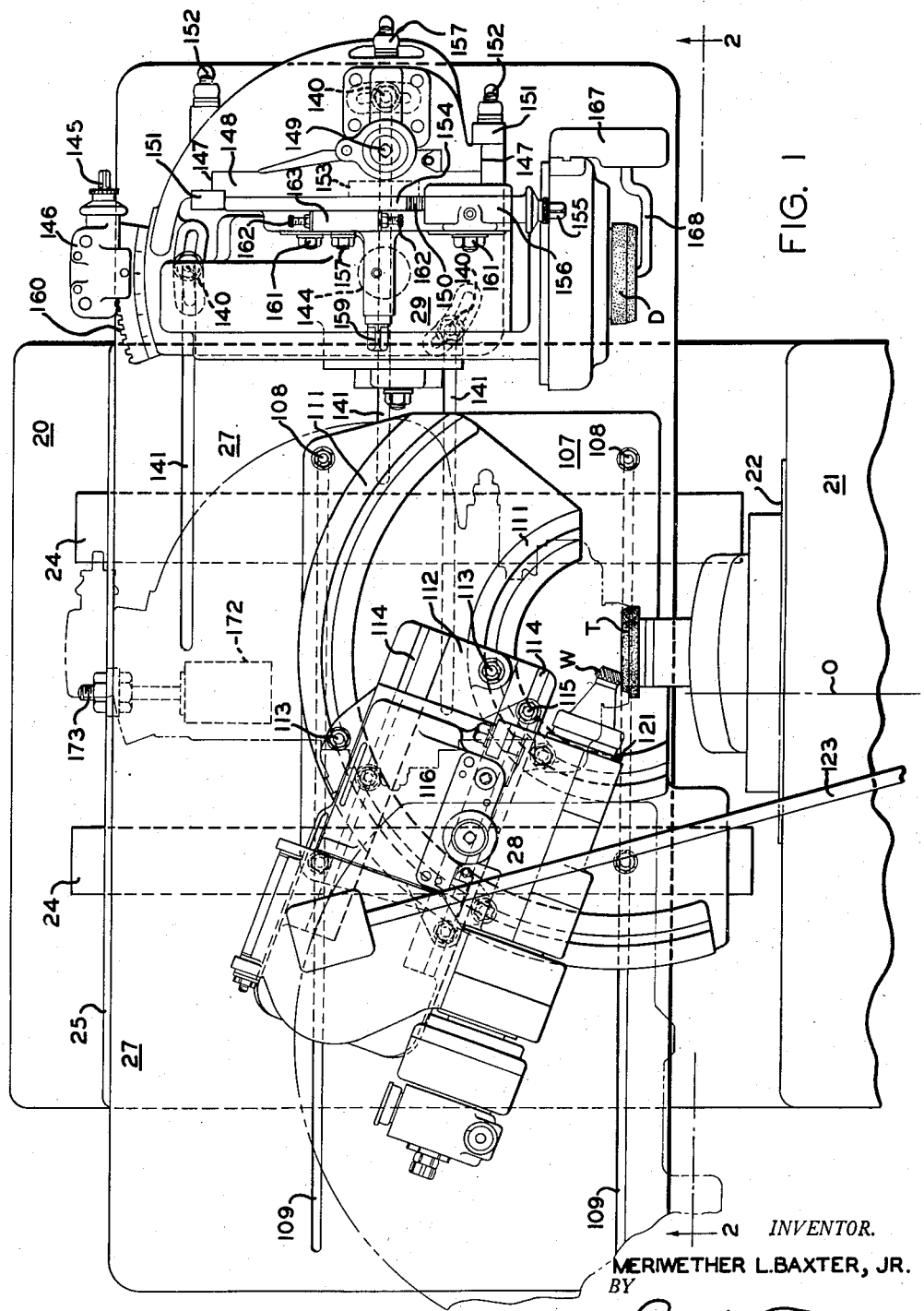
Fig. 1 is a fragmentary plan view of the machine.
Figure 2:
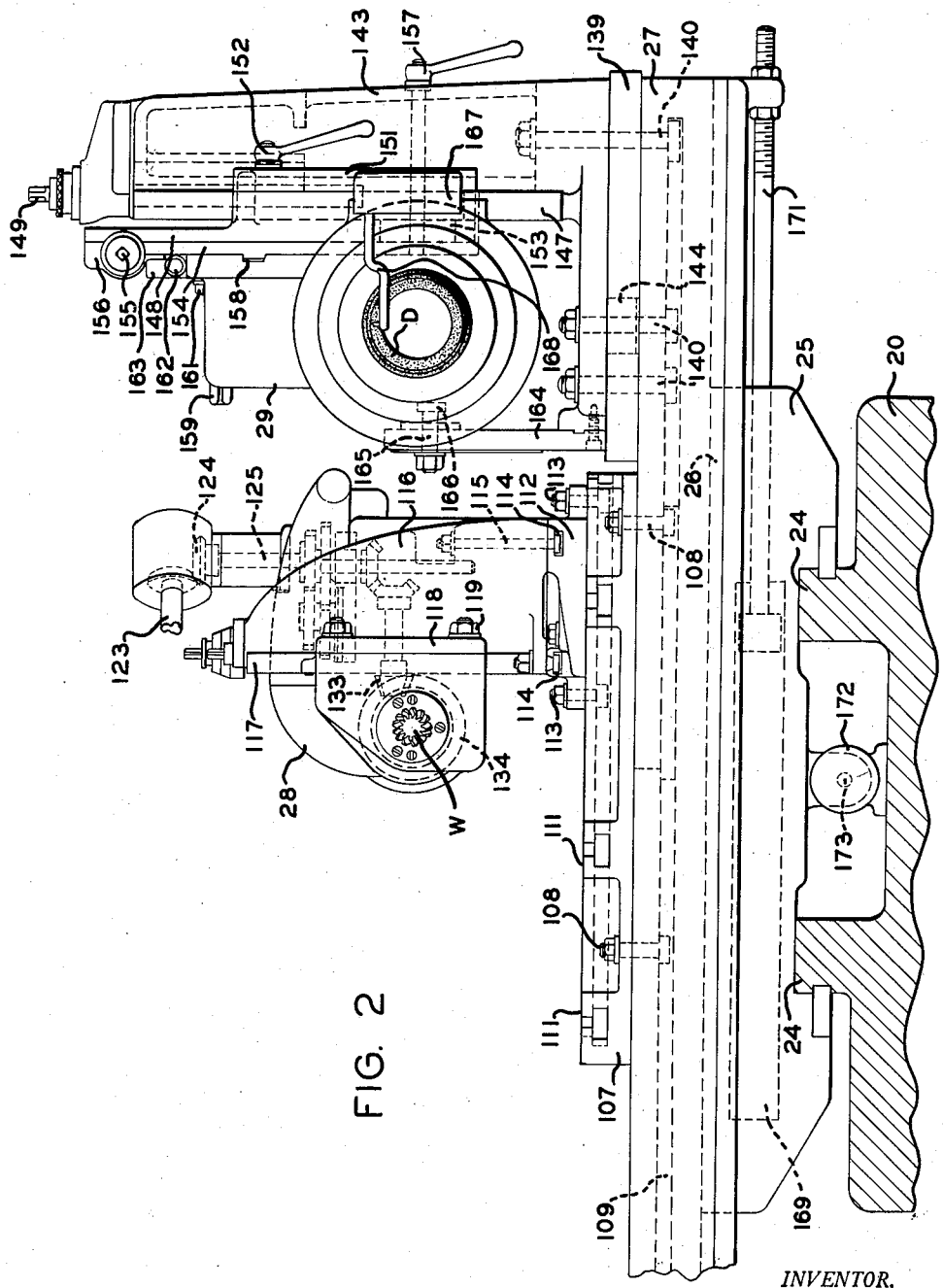
Fig. 2 is a vertical sectional view taken approximately along line 2—2 of Fig. 1 but with the work head of the machine swung to another position.

As shown in Figs. 1 and 2 the machine has a base 20 with a cradle housing 21 supporting a cradle 22 for rotation about a horizontal axis O, the cradle in turn supporting a spindle for a tool T in the form of an abrasive cup wheel. Mounted on ways 24 on base 20, for movement longitudinally of the machine, is a sliding base 25 having ways 26 on which a cross-slide 27 is movable transversely of the machine. The cross-slide carries a work head 28 supporting a spindle for the work W and also carries a dresser head 29 mounting a spindle for an abrasive dressing wheel D.

*The cradle assembly, and the cradle and tool drives*

Figure 3:
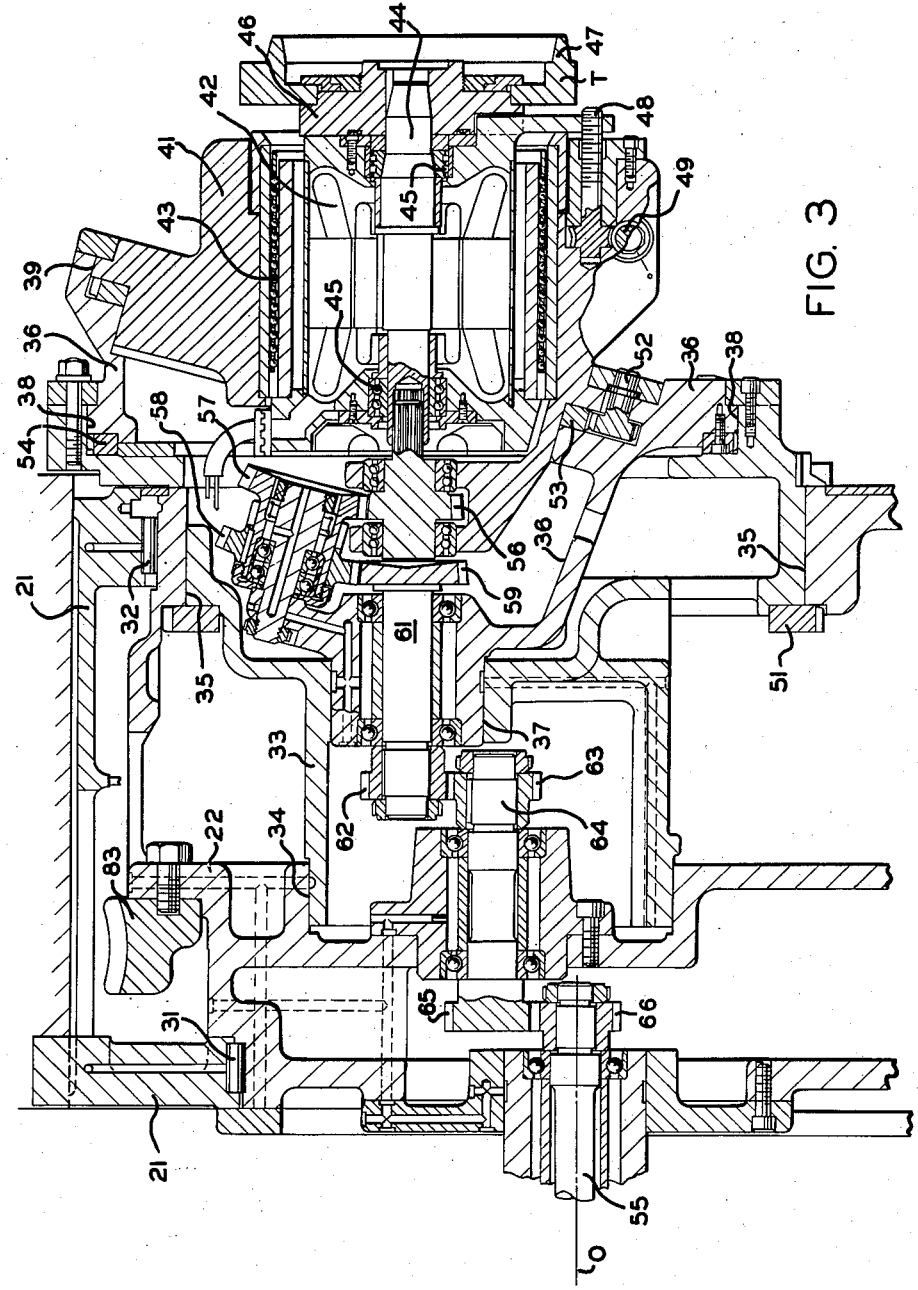
Fig. 3 is a fragmentary sectional view through the cradle which adjustably and rotatably supports the finishing tool.

Referring to Fig. 3, the cradle 22 is mounted on anti-friction bearings 31 and 32 for rotation within the cradle housing 21 about the cradle axis O. A drum 33 is mounted on plain bearings 34 and 35 for angular adjustment within and relative to the cradle on an axis eccentric to the cradle axis. A swivel head 36 is arranged for angular adjustment relative to the drum about an axis eccentric to the drum axis, being for this purpose mounted in the drum on plain bearings 37 and 38. Mounted on plain bearings 39, for annular adjustment relative to the swivel head 36 on an axis inclined to and intersecting the swivel head axis, is a motor bracket 41.

A reversible electric motor 42 is mounted in the motor bracket 41 on a ball sleeve bearing 43, and the motor armature shaft 44, journalled in anti-friction bearings 45, mounts the hub 46 of the abrasive wheel T whose active portion is the spiral thread 47. The motor and wheel assembly may be adjusted axially relative to the bracket 41 on the ball sleeve bearing by turning a screw 48 which is journalled in the bracket and threaded to a part of the motor. The screw may be turned by rotating a stub shaft 49 which has a worm meshing with a worm wheel on the screw. This adjustment may be employed to advance the tool prior to each tool dressing operation.

With the arrangement described the motor shaft, which constitutes the spindle of tool T, may be adjusted radially with respect to the cradle axis 22 by rotating the drum 33 in bearings 34 and 35 by suitable adjusting means, such as a ring gear 51 on the drum operated by a pinion (not shown). The tool spindle may also be tilted in any direction by rotating the motor bracket 41 in bearings 39, to establish the angle of tilt, and by rotating the swivel head 36 in bearings 37 and 38 to establish the direction of tilt. The rotation of bracket 41 may be effected by turning a stub shaft 52 which is mounted in the swivel head and has a pinion meshing with a ring gear 53 on the bracket. Similar means, including a ring gear 54 on the swivel head may be employed to rotatably adjust the latter.

The tool spindle 44 is geared to a shaft 55, that is journalled on the cradle axis, by a train of gearing which also appears in the drive diagram, Fig. 4. This train includes a gear 56 on a stub shaft which is journalled in the motor bracket 41 and is splined to the tool spindle; a gear 57 mating with a gear 56 journalled on the swivel head 36 on the axis of bearing 39, the gear 57 being keyed to a gear 58 which meshes with a gear 59 on a shaft 61 journalled in the swivel head on the axis of bearings 37 and 38; a pair of gears 62 and 63 respectively keyed on shaft 61 and on a shaft 64 that is journalled in the cradle 22 on the axis of bearings 34 and 35; and a pair of gears 65 and 66 respectively mounted on shafts 64 and 55.

The drive for the cradle, by means of which the tool T while rotating about the axis of its spindle 44 is simultaneously rotated about the axis O, is also shown schematically in Fig. 4. It includes an electric motor 67 which through gears 68 drives a shaft 69. Through suitable roll reversing means, not specifically illustrated since the same are well known in this art, the shaft 69 may be alternately connected, after rotating through a predetermined angle, with forward and reverse drive gears 71 and 72 which are coaxial therewith. In the schematic illustration the reversing mechanism is shown as comprising a toothed coupling member 73 splined to shaft 69 and slidable thereon into alternate engagement with toothed coupling formations on fears 71 and 72.

Forward drive gear 71 when coupled to shaft 69 acts through rate-of-roll change gears comprising a gear cluster 74, 75 and a driven gear 76 to drive a counter shaft 77 in the same direction; while the reverse gear 72 when coupled to shaft 69 directly rotates a driven gear 78 on shaft 77 to turn the latter in the opposite direction. The counter shaft through gear pair 79 drives a shaft 81 which carries a worm 82 that meshes with worm wheel 83 on the cradle 22 (Fig. 3).

The interconnection between the cradle drive and the tool spindle drive will now be described, also with reference to Fig. 4. This interconnection includes ratio-of-roll change gears designated 84, 85, and 86, 87 which are driven by cradle worm shaft 81 and drive the shaft 88 which in turn, through bevel gears 89, drives the upright shaft 91. The latter carries one gear, 92, of a differential mechanism whose other members are a gear 93 mounted on tubular shaft 94 and a pinion 95, the later meshing with gears 92 and 93 and being mounted for rotation on a spider 96 carried by a shaft 97 coaxial with shaft 94. This shaft 94 is geared by members 98 and 99 to a shaft 102 to which is secured a bevel gear 103 mating with gears 104 and 105 that are rotatable on cradle axis shaft 55. A toothed coupling member 106 splined to shaft 55 is axially shiftable into coupling engagement with toothed formations on gears 104 and 105 so that one or the other of these gears, depending upon the direction of rotation of the reversible motor 42, may be connected to the shaft 55. It will now be seen that if shaft 97 and the differential spider 96 are held against rotation the shafts 91 and 94 will rotate in constant velocity ratio, and hence that the tool T will be rotated at a speed proportionate to that of the cradle, the velocity ratio between the cradle and the tool depending upon the ratio change gears 84, 85, 86, 87, which of course may be changed in accordance with the design of the gears or pinions being formed on the machine.

*The work support and drive means*

Referring again to Figs. 1 and 2, the work head 28 is adjustable relative to the cross-slide 27 in directions transverse of the machine, vertically, axially of the work, and also angularly about an upright axis. To this end a column base 107 is secured to the cross-slide by bolts 108 which are anchored in T-slots 109 that extend transversely of the machine in the cross-slide. The column base has arcuate ways 111 seating a swivel base 112 which is held in place by bolts 113 that are anchored in T-slots in the arcuate ways. Ways with T-slots 114 parallel to the work spindle axis are provided in the swivel base for holding bolts 115 which secure a work head column 116. The work head 28 is adjustable vertically along ways 117 on the column and after such adjustment may be clamped by a gib 118 which is connected to the column by threaded fasteners 119. It will be apparent that by these adjustments the work W and the tool T may be brought into the required angular and axial positional relationship.

The work W may be secured by any suitable chucking equipment to the work spindle 121 which is journalled in the head 28. The drive means for rotating the spindle appear in dotted lines in Fig. 2 but are best seen in the diagram, Fig. 4. As there shown the shaft 97, which is driven by the differential spider 96, is connected by bevel gears 122 to an overhead shaft 123. The latter in turn has a drive connection through bevel gears 124 with a vertical shaft 125 journalled in the column 116. Shaft 125 is connected by change gears 126 and 127 to a vertical splined shaft 128 that is journalled in the column. A bevel gear 129, slidable on the splines of this shaft during vertical adjustment of the work head, constantly meshes with bevel gear 131 on a shaft that is rotatable in head 28. On the same shaft with gear 131 is a hypoid pinion 133 which drives gear 134 on the work spindle 121.

By the described work spindle drive means the work is rotated conjointly by the cradle drive means, including motor 67 and the gearing train ending with differential gear 92, and by the tool drive means which include the motor 42 and the gear train ending with the differential gear 93. The ratio of the combination of cradle motion and tool motion to the motion of the work may be varied by changing the index change gears 127. The work drive train, including the work spindle 121 and the differential spider 96, may be locked against rotation in a definite angular position of shaft 123 by a solenoid operated lock 135, such locking being effective during the dressing of the tool T which will be more fully described hereinafter. Similarly the cradle may be locked against rotation by a solenoid operated lock 136 during the operation of the tool on the work when producing a non-generated gear. These solenoids may be operated by suitable switch means which are not shown since they are not of the present invention. They may be operated either manually or automatically.

*The dresser mechanism*

The dresser head 29 contains an electric motor 137 whose armature shaft 138 constitutes the spindle of the dresser wheel D. The head is adjustable so that this wheel may be adjusted in the same directions as the tool T. In general these adjustments of the dresser head may be affected similarly to the adjustments of a cutter head shown and described in Wildhaber Patent No. 1,724,241, to which reference is made. Referring to Figs. 1 and 2 of the present disclosure, a column base 139 is mounted for adjustment on the cross-slide 27 in a direction transverse of the machine, along T-slots 141 which are formed in the cross-slide. Bolts 140 anchored in these T-slots hold the column base on the cross-slide in the selected position of transverse adjustment.

A column 143 is mounted on the column base for adjustment around a trunnion 144 about a vertical axis, such adjustment being effected by turning a worm 145 which is journalled in a housing 146 that is provided on the column base and which engages a worm wheel sector 160 on the bottom of the column. The column is held in adjusted position by the bolts 140, which, as shown in Fig. 1, extend through arcuate slots in the column. Adjustable on ways 147 on column 143 is a vertical slide 148 whose adjustment may be effected by turning a screw 149 which is rotatable in the column and is threaded to the slide. The slide is secured in adjusted position by tightening gibs 151 by screws 152.

Pivoted to the slide on a trunnion 153, for adjustment about a horizontal axis perpendicular to the dresser spindle axis, is a plate 154. The adjustment of the plate may be effected by turning a worm 155 which is journalled in a housing 156 on the slide and is in threaded engagement with a worm gear segment 150 provided on the plate. After such adjustment the plate may be locked to the slide by threaded fasteners 157.

The dresser head 29 is adjustable axially of the dresser spindle on ways 158 (Fig. 2) by means of a rack and pinion (not shown), the rack being provided on the plate 154 and the pinion on a shaft 159 shown in Fig. 1. Such adjustment may be employed to advance the dresser wheel D to compensate for stock to be removed when it is profiled. After such adjustment the head 29 may be clamped to plate 154 by tightening screw fasteners 161. In order to limit the amount of the adjustment effected by turning shaft 159 after fasteners 161 have been loosened, adjustable screw stops 162 are provided. These are threaded into a part 163 carried by the plate and act as stops against surfaces provided on the head.

After the head 29 has been adjusted it may be clamped to a support 164, which extends from the column base 139, by tightening a bolt 165. The head of this bolt is anchored in a horizontal T-slot 166 in the head while the bolt shank extends through a vertical slot in the support.

For providing the desired shape on the working surface of the rim of the cup-shaped dressing wheel D a suitable profiling mechanism is provided on the head 29. The details of this mechanism, which may be either manually or automatically power operated, are not a part of the present invention and hence the mechanism is illustrated only in outline as comprising a body 167 and an arm 168 whose outer end may carry a diamond or other suitable kind of tool capable of dressing the wheel D. If desired the profiling mechanism 167, 168 may be of the kind shown in application Serial No. 638,029, filed by Ernest Wildhaber, on December 29, 1945, now Patent No. 2,587,261, granted Feb. 26, 1952.

*Operation*

The cross-slide 27 may be shifted on the sliding base 25 by means of a hydraulic cylinder and piston unit controlled by suitable valve means (not shown) whose operation may be either manual or automatic. As shown in Fig. 2 the cylinder, designated 169, may be affixed to the sliding base while the piston rod, 171, may be adjustably connected to the cross-slide. The sliding base may be shifted on the machine base 20 by a similarly operated hydraulic unit comprising a cylinder 172 secured to the base 25 and a piston whose rod 173 is adjustably connected to the sliding base.

Assuming that the work W and the wheels T and D have been mounted on their respective spindles, and that the spindles have been adjusted into the proper relationship, the first operation is to dress on the wheel D a shape corresponding to the tooth profile desired for an imaginary generating gear for the particular gear to be produced. This operation is performed by first advancing the wheel D axially to provide sufficient stock for profiling and then, while the wheel is being rotated by its motor 137, slowly moving the profiling arm 168 across the active profile of the wheel.

Next the tool wheel T is dressed by the wheel D, which of course is harder than wheel T. To accomplish this the tool wheel is first advanced by the adjustment means 48, 49 to provide stock for dressing. Then the sliding base is withdrawn by cylinder-piston unit 172, 173, i. e. moved along ways 24 to withdraw the work W from the wheel T; the cross-slide is shifted to the left, as viewed in Figs. 1 and 2, by the cylinder-piston unit 169, 171 to bring the wheel D adjacent to the wheel T; and the sliding base is advanced by the means 172, 173 to bring the elements D and T into dressing relationship shown in broken lines in Fig. 1, and also shown in Fig. 7. Then with shaft 123 locked by means 135 and with wheel D rotating, the motor 67 is set into operation, causing the wheel T to rotate about its own axis with its periphery in contact with D and simultaneously to rotate about the cradle axis, thereby dressing a spiral thread on wheel T. It will be noted that during this operation the wheel T is rotated slowly, and no power is applied to motor 42.

The sliding base is then retracted, the cross-slide shifted to the right to bring the wheel T and the work W into adjacency, and the sliding base advanced, bringing the machine again to the condition shown in full lines in Fig. 1 and also shown in Figs. 5 and 6. Now with means 135 unlocked both motors 42 and 67 are operated, respectively rotating the tool T rapidly about its axis and slowly about the cradle axis, and conjointly (through the differential gears 92, 94, 95) rotating the work W about its axis, the spiral thread on the tool will grind the gear tooth surfaces on the work. During this operation the spiral thread on the tool will successively enter the tooth spaces of the gear blank W, and with continued rotation will traverse each of them a number of times during one generating roll of the cradle through a fraction of one turn about axis O.

This pass of the tool through the work may be repeated to remove additional stock from the gear blank. Such repetition preferably is accomplished by withdrawing the sliding base at the conclusion of one generating roll, causing a reverse roll of the cradle by shifting the roll reversing means 73, advancing the sliding base slightly (by adjusting the connection between piston rod 173 and the sliding base) to provide for additional stock removal from the gear blank, again reversing the roll-reversing means 73, and then repeating the generating roll. Of course if desired the dressing of the tool T with the wheel D can be repeated between successive passes, or any desired number of such passes may be made between dressings of the tool. In any case it is preferred to roll the cradle in the same direction while the tool T is being dressed by the wheel D as during the gear forming operation, in order to eliminate possible error due to backlash in the operating gear train.

The operation described will produce a generated gear since the action of the wheel T in rolling about the axis O in constant angular velocity ratio to the rotation of the gear blank W about its axis (neglecting the component of rotation of the blank which corresponds to the lead of the spiral thread on the tool) simulates the rotation of an imaginary generating gear rolling in mesh with the gear being produced. To produce a non-generated gear, i. e. one having tooth surfaces exactly complementary to those of an imaginary generating gear, the same operations are carried out except that during the forming of the gear with the tool T the motor 67 is stopped and the cradle is held against rotation by the lock 136.

The relationship of the dresser D, tool T and work W may be further explained with reference to Figs. 8 and 9. In the first mentioned view the dotted lines 174 represent the cross-sectional outline of a rotary face mill cutter employed in the generation of spiral bevel and hypoid gears and pinions and also in the forming of gears without generation by conventional methods. The inner active surface 175 of such a cutter when rotated presents a surface of revolution which represents one tooth surface of the generating or forming gear. By the operation of the dressing means 167, 168 the outside surface of revolution 176 of the dresser wheel D is made complementary in shape to this imaginary tooth surface. When the tool T is now rotated about its axis H (the axis of the tool spindle 44) with its inner periphery in contact with surface 176, while the axis H is simultaneously rotating about the cradle axis O, the inside surface 177 of the spiral thread is formed. If this surface 177 is now rotated about its axis H in contact with a gear blank, while the latter is relatively rotated about the same axis O, it will be apparent that the surface formed on the blank will be exactly like surface 176 and will be exactly complementary to the inside surface of revolution described by the imaginary cutter 174. This is essentially what is done in producing a non-generated gear on the machine of the present invention, in which case the axis of the work is aligned with the cradle axis O, and the blank is rotated about that axis at the same velocity relative to rotation of the wheel T that the latter is rotated about axis O when it is in contact with the dresser D. The same result is obtained in so far as concerns tooth surface shape, as though the cutter 174 were rotated about its axis in cutting relation to the blank, with the blank and the cradle both stationary.

When producing a generated pinion (or gear) by the present method the same principle applies. However, an additional rotation is imposed upon the work, and the cradle is rotated about axis O, thereby achieving the same effect, in so far as concerns tooth surface shape produced on the blank, as though the cutter 174 were rotated about its axis C in timed rotation of axis C about axis O and rotation of the work about the work spindle axis.

The generation of the outside surface 178 of the spiral thread on wheel T, for producing the other side of the gear teeth on the work, is effected in the same manner as the inside surface, the only difference being that in this case a larger diameter dressing wheel, designated $D_1$, must be used. The relationship between this wheel and the wheel T is shown in Figs. 10 and 11. If, by interchange of wheels D and $D_1$, both the inner and outer surfaces 177 and 178 are dressed on the same wheel T, then the latter may be used to produce simultaneously both sides of the teeth on the gear blank. However, it is contemplated that with the present invention the opposite sides of the teeth usually will be produced by separate operations either on the same or on two different machines.

Figs. 8 to 11 illustrate the simple case of the wheels D and T rotating on parallel axes, C and H. However this is not necessary to the practice of the invention, and in some cases it may be desirable to make these axes non-parallel. In these cases the spiral thread will, of course, have a lead along the axis H, and hence will be generally in the form of a spiral described upon a conical surface. Similarly the invention is not limited to the form shown wherein the active surfaces of the dresser D are conical: if desired they may be of other form, spherical for example. In general, the active surfaces of the dresser D may be of any form which is complementary to the various kinds of surfaces of revolution presented by existing circular face mill cutters when rotated in conventional bevel and hypoid gear forming and generating machines.

Figs. 12 and 13 show the geometrical relationship involved in generating the inside and outside spiral surfaces 177 and 178, rotating about center H, from a circle $t$ (representing the periphery of the dressing wheel D or the tooth curvature of a crown generating gear) having its center at C and rotating relative to the spiral surface about the cradle axis and crown gear center O. While the relative rotations about H and O may be in either direction, they are assumed to be in opposite directions in the illustrations. Line OH connects the turning centers, I being the instant center of relative rotation, and distances OI and IH being related to each other as the number of teeth in the generating gear to the number of spiral threads on the tool when the axes O, C and H are parallel. While only one thread is shown in the illustrated embodiment there may be a greater number if desired.

The distance MC is the radius of the generating circle $t$, and, passing through point I, is therefore a normal to the contacting curves.

Point K is the center of curvature of the spiral thread, 177 or 178. Since in Fig. 12 the distance MK is greater than MC, the spiral 177 is less curved than the circular tooth $t$, and the convex tooth side (i. e., the outer periphery 176 of wheel D) generates the concave spiral surface 177. In Fig. 13 the distance MK is less than MC, and hence the spiral 178 is more curved than the circular tooth $t$, so that the concave tooth side (the inner periphery of wheel $D_1$) generates the convex spiral surface 178. It will thus be seen that if the same dressing wheel D is used for generating the inside and outside spiral surfaces, these spiral surfaces usually will have to be formed on separate tools T. Or, if both spiral surfaces are to be formed on a single tool wheel T, the dressing wheel $D_1$, for dressing the outside spiral surface, will have to be of larger diameter than the wheel D which dresses the inside spiral surface.

In both cases as the generation of the spiral proceeds from M' (at the inner end of the crown gear tooth) to M and then to M'' at the outer end of the tooth, the center of tooth curvature rotates about O from C' to C to C'', and the contact normal proceeds from C'M' to CM to C''M''. Curve M'MM'' is the path of action, and angle $B = C''OC'$ is the corresponding angle of crown gear (cradle) rotation. The corresponding angle of rotation of the spiral thread about center H will be $$B\left(\frac{\text{distance OI}}{\text{distance IH}}\right)$$

for the case when axes O, C and H are parallel. In any case the axis H must be so located that the normal velocity component of the point M on the tool T is the same as the normal velocity component of a point at M on the periphery of wheel D or $D_1$. By "normal velocity component" is meant the velocity component in a direction normal to the contacting surfaces.

Given the relative locations O, C and M, the location of the instantaneous center I, which must lie among the line of points C and M, is chosen with regard to the length of the spiral surface that is necessary to traverse the length of the tooth, from M' to M''. The length of this spiral increases when the distance CI is increased, is reduced when the distance CI is shortened. After the point I has been located, either by computation, layout or trial, the point H is located along the line OI in the manner referred to in the preceding paragraph. In this connection it is noted that H will be disposed between O and I, rather than in the position illustrated, when the relative rotations about the centers O and H are in the same direction. For any position of M the point K, the center of curvature of the spiral, may be located readily by well known methods, as for example the method shown in Fig. 13 where a perpendicular to line MC is erected through point I, and from the point of intersection of this perpendicular with line OC, a line through point H is drawn. Point K occurs at the intersection of this last line with line MC.

By reference to Fig. 12 it will be seen that during the generation of the spiral surface 177 of the tool by the conical dressing surface 176, the surface 177 is always normal, at contact M, to the plane (represented by line M—K) which contains the axis C of the dressing wheel and the instantaneous axis I of the rotations about the cradle or generating gear axis O and about the tool axis H. The geometrical shape of the spiral 177 will of course be the same whether generated by motion of the tool T relative to the stationary dresser wheel D or by motion of wheel D relative to the tool, with the tool held stationary.

Thus, it will be seen that, considered in its static condition, the spiral 177 constitutes the locus of intersection of a certain plane (M—K) with the curved surface of revolution 176 that is rotated about an other axis (O) than its own axis (C) in constant angular velocity relationship to rotation of said other axis relative to the tool about the axis (H) of rotation of the tool, said curved surface of revolution representing a tooth surface of the generating gear and said other axis representing the axis of the generating gear, and said certain plane being the plane which contains the axis of said surface of revolution and the instantaneous axis of the aforementioned two rotations respectively about axis O and about axis H. Expressed in another way, and again considering the tool T to be stationary, the spiral 177 is the geometrical envelope of successive positions of a curved surface of revolution 176 that is rotated at constant velocity about a certain axis, namely an axis which represents the cradle axis O of the gear generating machine, while said certain axis is rotated relative to the tool at constant velocity about the tool's axis of rotation H.

While the invention has been described herebefore as applied to a method and apparatus for producing gears by grinding, it will be understood that the same principles may be applied to other processes. For example the wheel T instead of being made up of abrasive material may be made of metal and an abrasive applied to it during the gear forming operation which would thus become a lapping process. Or, the wheel may be made up of metal formed, as shown in Fig. 14, with a multiplicity of gashes 179 extending across its spiral surface, thereby providing a gear tool adapted to finish the tooth surfaces by a shaving process. In any case the working portions of the tool, whether comprising cutting edges or abrasive material, lie upon the spiral surface of the tool.

This description of the invention has been made by way of illustration and not by way of limitation, for those skilled in the art will recognize various changes and modifications which may be made without departing from the inventive principles herein disclosed, and hence there is no intention to limit the scope of the invention except as may be required by the appended claims:

I claim:

1. The method of producing a longitudinally curved tooth gear, comprising dressing a spiral thread on a rotatable tool by rotating the tool about its axis in dressing engagement with a dressing element which presents a curved surface of revolution, and simultaneously and in timed relationship rotating the tool about a second axis; and then rotating the tool about its axis with the thread in working engagement with a work gear while simultaneously rotating the latter about its axis and rotating the tool about the second axis, the rotation of the work gear having a component bearing a timed relationship with rotation of the tool about its axis whereby the lengthwise gear tooth curvature will be conjugate to the curvature of the surface of revolution described by the dressing element, and the rotation of the gear blank having another component bearing a timed relationship to the rotation of the tool about said second axis for generating the gear tooth profile.

2. The method of producing a longitudinally curved tooth gear, comprising dressing a spiral thread on a rotatable tool by rotating the tool about its axis in dressing engagement with a dressing element which presents a curved surface of revolution, and simultaneously and in timed relationship rotating the tool about a second axis; and then rotating the tool about its axis with the thread in working engagement with a work gear while simultaneously rotating the latter about its axis and rotating the tool about the second axis, the rotation of the work gear having a component bearing a timed relationship with rotation of the tool about its axis whereby the lengthwise gear tooth curvature will be the conjugate to the curvature of the surface of revolution of the dressing element.

3. The method of making a longitudinally curved tooth gear which comprises rotating a gear producing tool in contact with a curved surface of revolution, whose curvatures correspond to those of a tooth surface of the generating gear which the tool represents, while rotating the tool relative to said surface of revolution about an axis other than their axes and which represents the axis of the generating gear, to thereby form a spiral surface on the tool; and then rotating the tool in contact with a rotating work gear while simultaneously effecting a relative motion between the tool and the work gear about an axis corresponding to said other axis.

4. In a gear making machine the combination of a work spindle and a rotatable cradle, a tool spindle rotatable on the cradle, a dresser spindle, means for alternately bringing the work spindle and the dresser spindle into working relationship with the tool spindle, a first drive means for the cradle, a second drive means for the tool spindle, and differential means connecting the work spindle with the first and second drive means, whereby the cradle and the tool spindle may be rotated by said first drive means when the tool spindle and the dresser spindle are in operative relationship, and the work spindle may be rotated by both of said drive means when the work spindle and the tool spindle are in operative relationship.

5. In a gear making machine the combination of a work spindle and a cradle rotatable about their respective axes, a tool spindle rotatable on the cradle, a dresser spindle, means for alternately bringing the work spindle and the dresser spindle into working relationship with the tool spindle, a first drive means for the cradle, a second drive means for the tool spindle, and differential means connecting the work spindle with the first and second drive means, whereby the cradle and the tool spindle may be rotated by said first drive means when the tool spindle and the dresser spindle are in operative relationship, and the work spindle may be rotated by both of said drive means when the work spindle and the tool spindle are in operative relationship, and means for holding the work spindle against rotation when the cradle and the tool spindle are being rotated and the tool spindle and the dresser spindle are in operative relationship.

6. In a gear making machine the combination of a work spindle and a cradle rotatable about their respective axes, a tool spindle rotatable on the cradle, a dresser spindle, means for alternately bringing the work spindle and the dresser spindle into working relationship with the tool spindle, cradle drive means, tool spindle drive means, and differential means connecting the work spindle with the two drive means, and means for holding the cradle against rotation when the tool spindle is in operative relationship to the work spindle, whereby the tool spindle may be rotated by the cradle drive means when the tool spindle and the dresser spindle are in operative relationship, and the work spindle may be rotated by the tool spindle drive means when the work spindle and the tool spindle are in operative relationship.

7. In a gear generating machine the combination of a work spindle and a cradle mounted for rotation about their respective axes, a tool spindle rotatable on the cradle about an axis that is displaced from the axis about which the cradle is rotatable, a dresser spindle, means for alternately bringing the work spindle and the dresser spindle into working relationship with the tool spindle, means for simultaneously rotating the cradle and the tool spindle in predetermined velocity ratio about their respective axes when the dresser spindle is in working relationship with the tool spindle and also when the work spindle is in working relationship with the tool spindle, and means for simultaneously rotating the work spindle in predetermined velocity ratio to tool spindle rotation when it is in working relationship with the tool spindle.

8. In a gear making machine the combination of a work spindle and a cradle mounted for rotation about their respective axes, a tool spindle rotatable on the cradle about an axis that is displaced from the axis about which the cradle is rotatable, a dresser spindle, means for alternately bringing the work spindle and the dresser spindle into working relationship with the tool spindle, means for simultaneously rotating the cradle and the tool spindle in predetermined velocity ratio when the latter is in working relationship with the dresser spindle, and means for simultaneously rotating the tool spindle and the work spindle in predetermined velocity ratio when they are in working relationship.

9. In a gear making machine the combination of a base, a slide movable on the base between first and second positions, a work spindle and a cradle respectively mounted for rotation on the slide and on the base, a tool spindle rotatable on the cradle, a dresser spindle on the slide, the tool spindle being in working relationship to the dresser spindle in the first position of the slide and in working relationship to the work spindle in the second position of the slide, means for simultaneously rotating the cradle and the tool spindle in predetermined velocity ratio when the slide is in the first position, and also when the slide is in the second position, and means for simultaneously rotating the work spindle in predetermined velocity ratio to tool spindle rotation when the slide is in the second position.

10. In a gear making machine the combination of a base, a slide movable on the base between first and second positions, a work spindle and a cradle respectively mounted for rotation on the slide and on the base, a tool spindle rotatable on the cradle about an axis that is displaced from the axis about which the cradle is rotatable, a dresser spindle on the slide, the tool spindle being in working relationship to the dresser spindle in the first position of the slide and in working relationship to the work spindle in the second position of the slide, means for simultaneously rotating the cradle and the tool spindle in predetermined velocity ratio when the slide is in the first position, and means for simultaneously rotating the tool spindle and the work spindle in predetermined velocity ratio when the slide is in the second position.

11. In a gear making machine the combination of a base, a slide movable on the base between first and second positions, a work spindle and a cradle respectively mounted for rotation on the slide and on the base, a tool spindle rotatable on the cradle, a dresser spindle rotatable on the slide and means to rotate said dresser spindle, the tool spindle being in working relationship to the dresser spindle in the first position of the slide and in working relationship to the work spindle in the second position of the slide, cradle drive means, tool spindle drive means, means connecting the two drive means differentially with the work spindle, whereby in the first position of the base the cradle and the tool spindle may be rotated simultaneously to form a spiral thread on a tool carried by the tool spindle, by engagement of such tool with a dresser on the rotating dresser spindle, and in the second position of the base the tool spindle, the cradle and the work spindle may be rotated simultaneously to generate, by action of such spiral thread, tooth surfaces on work carried by tool spindle, and means for holding the work spindle against rotation while the cradle and the tool spindle are being rotated in working relationship with the dresser spindle.

12. The method of producing a curved tooth gear which comprises continuously rotating in contact with each other, and in constant angular velocity ratio about their respective axes, a work gear and a tool having a spiral working surface, with the position of contact between the tool and the work gear progressing from end to end of the spiral working surface as it progresses from end to end of each tooth surface being produced; and simultaneously, and in constant angular velocity ratio with the aforementioned rotations, rotating said axes relative to each other about another axis to generate the gear tooth profiles.

13. The method of producing a longitudinally curved tooth tapered gear which comprises profiling a first rotating abrasive wheel to provide it with a curved surface of revolution that is complementary to a tooth surface of the generating gear of the work gear, then dressing a spiral surfaced thread on a second abrasive wheel by rotating the latter about its axis in dressing engagement with the first wheel while simultaneously rotating the second wheel about the generating gear axis, the rate of rotation about said generating gear axis being in the ratio 1/N to the rate of rotation about the axis of the second wheel, measured in relation to a line connecting said axes, where there is one spiral surfaced thread on the second wheel and where N is the tooth number of the generating gear; and then rotating the second wheel about its axis with the spiral surface in engagement with a work gear while simultaneously rotating the work gear about its axis and rotating the second wheel about the generating gear axis, the rotation of the work gear having a component bearing an angular velocity ratio to rotation of the second wheel about its axis that is equal to unity divided by the tooth number of the gear being produced, whereby the lengthwise tooth curvatures of the work gear and of the generating gear will be conjugate, and the rotation of the work gear having another component bearing an angular velocity relationship to the rotation of the second wheel about the generating gear axis in the ratio of N to the tooth number of the work gear, whereby the tooth profiles of the work gear and of the generating gear will be conjugate.

14. The method of producing a longitudinally curved tooth tapered gear which comprises profiling a first rotating abrasive wheel to provide it with a curved surface of revolution that is complementary to a tooth surface of the generating gear for the work gear, then dressing a spiral surfaced thread on a second abrasive wheel by rotating the later about its axis in dressing engagement with the first wheel while simultaneously rotating the second wheel about the generating gear axis, the rate of the rotation about said generating gear axis being in the ratio S/N to the rate of the rotation about the axis of the second wheel measured in relation to a line connecting said axes, where S is the number of spiral surfaced threads on the second wheel, or a multiple thereof, and N is the number of teeth in the generating gear, or a multiple thereof; and then rotating the second wheel about its axis with the spiral surface of the thread in engagement with a work gear while simultaneously rotating the work gear about its axis and rotating the second wheel about the generating gear axis, the rotation of the work gear bearing an angular velocity relationship with rotation of the second wheel about its axis that is proportional to S/N in the ratio of N to the tooth number of the work gear.

15. The method of producing a longitudinally curved tooth tapered gear which comprises providing upon a dressing element a curved surface of revolution coincident with a tooth surface of the generating gear for the gear being produced, then dressing a spiral surfaced thread on a wheel by rotating the wheel about its axis in engagement with the dressing element while simultaneously rotating the wheel about the generating gear axis, the rate of the rotation about said generating gear axis being in the ratio S/N to the rate of the rotation about the axis of the wheel measured in relation to a line connecting said axes, where S is the number of spiral surfaced threads on the wheel, or a multiple thereof, and N is the number of teeth in the generating gear, or a multiple thereof; and then rotating the wheel about its axis with the spiral surface of the thread in engagement with a work gear while simultaneously rotating the latter about its axis and rotating the wheel about the generating gear axis, the rotation of the work gear having a component bearing an angular velocity relationship with rotation of the wheel about its axis that is proportional to S/N in the ratio of N to the tooth number of the work gear, and the rotation of the work gear having another component bearing an angular velocity relationship to the rotation of the wheel about the generating gear axis also in the ratio of N to the tooth number of the work gear.

16. The method of producing a longitudinally curved tooth tapered gear which comprises providing upon a dressing element a curved surface of revolution coincident with a tooth surface of the generating gear for the work gear, then dressing a spiral surfaced thread on a wheel by rotating the wheel about its axis in engagement with the dressing element while simultaneously rotating the wheel about the generating gear axis, the rate of the rotation about said generating gear axis being in the ratio S/N to the rate of the rotation about the axis of the wheel measured in relation to a line connecting said axes, where S is the number of spiral surfaced threads on the wheel, or a multiple thereof, and N is the number of teeth in the generating gear, or a multiple thereof; and then rotating the wheel about its axis with the spiral surface of the thread in engagement with a work gear while simultaneously rotating the latter about its axis and rotating the wheel about the generating gear axis, the rotation of the work gear having a component bearing an angular velocity relationship with rotation of the wheel about its axis that is proportional to S/N in the ratio of N to the tooth number of the work gear.

17. The method of making a tapered gear which comprises rotating a gear producing tool in contact with a curved surface of revolution while rotating the tool relative to said surface of revolution about an axis other than their axes to thereby form a spiral surface on the tool; and then rotating the tool in contact with a rotating work gear while simultaneously effecting a relative motion between the tool and the work gear about an axis corresponding to said other axis.

18. A rotatable tool for producing gear tooth surfaces, said tool having working portions disposed substantially along a spiral surface which is the locus of the intersection of a curved surface of revolution, which is rotated about an axis other than its own in constant angular velocity relationship to rotation of said other axis about the axis of rotation of the tool, with a plane which contains the axis of the surface of revolution and the instantaneous axis of the afore-mentioned two rotations.

19. The method of making a rotatable spiral threaded gear making tool which comprises dressing a rotating abrasive wheel to provide it with a curved surface of revolution that is complementary to a longitudinally curved tooth surface of a generating gear which the tool will represent when in use; and then rotating the tool about its axis in engagement with said surface of revolution while simultaneously, and in constant angular velocity relationship, effecting relative rotation of the wheel and the tool about the axis of said gear in the ratio of one turn of the tool about its axis to a rotation of the wheel relative to the tool about the axis of said gear of one circular pitch of said gear or an integral multiple thereof.

20. The method of making a rotatable spiral threaded gear making tool which comprises forming on a dressing member a curved surface of revolution complementary to a longitudinally curved tooth surface of a generating gear which the tool will represent when in use; and then rotating the tool about its axis in engagement with said surface of revolution while simultaneously, and in constant angular velocity relationship, effecting relative rotation of the member and of the tool about the axis of said gear in the ratio of one turn of the tool about its axis to a rotation of the dressing member relative to the tool about the axis of said gear of one circular pitch of said gear or an integral multiple thereof.

21. The method of making a rotatable spiral threaded gear making tool which comprises forming on a dressing member a curved surface of revolution complementary to a longitudinally curved tooth surface of a generating gear which the tool will represent when in use; and then rotating the tool about its axis in engagement with said surface of revolution while simultaneously effecting relative rotation of the member and of the tool about the axis of said gear in the ratio of one turn of the tool about its axis to a rotation of the dressing member relative to the tool about the axis of said gear of one circular pitch of said gear or an integral multiple thereof.

22. The method of making a rotatable spiral threaded gear making tool which comprises rotating the tool about its axis in contact with a curved surface of revolution on a dressing member, which surface is complementary to a longitudinally curved tooth surface of a generating gear which the tool will represent when in use, while simultaneously and in constant angular velocity relationship effecting relative rotation of the tool and member about the axis of said gear in the ratio of one turn of the tool about its axis to a rotation of the dressing member relative to the tool about the axis of said gear of one circular pitch of said gear on an integral multiple thereof.

23. The method of making a rotatable spiral threaded gear making tool which comprises rotating the tool about its axis in contact with a curved surface of revolution on a dressing member, which surface is complementary to a longitudinally curved tooth surface of a generating gear which the tool will represent when in use, while simultaneously effecting relative rotation of the tool and the member about the axis of said gear in the ratio of one turn of the tool about its axis to a rotation of the dressing member relative to the tool about the axis of said gear of one circular pitch of said gear or an integral multiple thereof.

24. A rotatable tool for producing gear tooth surfaces, said tool having working portions disposed substantially along a spiral surface which is the locus of intersection of a certain plane with a curved surface of revolution that is rotated about an other axis than its own in constant angular velocity relationship to rotation of said other axis relative to the tool about the axis of rotation of the tool, said curved surface of revolution representing a tooth surface of a generating gear and said other axis representing the axis of the generating gear, and said certain plane being the plane which contains the axis of said surface of revolution and the instantaneous axis of the aforementioned two rotations.

25. A tool for producing gear tooth surfaces by being rotated about its axis while in contact with a work gear rotating about its own axis while said axes are rotated relative to each other about a third axis, said tool having working portions disposed substantially along a spiral surface which is the geometrical envelope on the tool of successive positions of a curved surface of revolution that is rotated about a certain axis, which represents said third axis, while said certain axis is rotated relative to the tool about the axis of rotation of the tool.

26. The method of making a curved tooth tapered gear which comprises rotating it about its axis in mesh with a tool which is rotating about its own axis relative to the tapered gear, said tool having working portions disposed substantially along a spiral surface which is the locus of intersection of a certain plane with a curved surface of revolution that is rotated about an other axis than its own in constant angular velocity relationship to rotation of said other axis relative to the tool about the axis of rotation of the tool, said curved surface of revolution representing a tooth surface of a generating gear for the tapered gear and said other axis representing the axis of the generating gear, and said certain plane being the plane which contains the axis of said surface of revolution and the instantaneous axis of the aforementioned rotations about said other axis and about the axis of rotation of the tool.

27. The method of making a curved tooth tapered gear which comprises rotating it about its axis in mesh with a tool which is rotating about its own axis relative to the tapered gear while said axes are rotating relative to each other about a third axis, said tool having working portions disposed substantially along a spiral surface which is the geometrical envelope on the tool of successive positions of a curved surface of revolution that is rotated about a certain axis, which represents said third axis, while said certain axis is rotated relative to the tool about the axis of rotation of the tool.

28. The method of making a curved tooth tapered gear which comprises rotating it about its axis in mesh with a tool which is rotating about its own axis relative to the tapered gear while said axes are rotating relative to each other about an axis which represents the axis of a generating gear for said tapered gear, said tool having an abrasive spiral surface disposed substantially along the envelope of successive positions of a curved surface of revolution, which represents a tooth surface of the generating gear, when said curved surface of revolution is rotated about a certain axis, which also represents the axis of the generating gear, while said certain axis is rotated relative to the tool about the axis of rotation of the tool.

29. A rotatable gear producing tool having an abrasive spiral surface, said surface being disposed along the envelope of successive positions of a curved surface of revolution rotated about an axis other than its own while said axis is rotating relative to the tool about the axis of rotation of the tool in constant angular velocity relationship with the rotation about the first-mentioned axis, the curved surface of revolution representing a tooth surface of a generating gear and said first-mentioned axis representing the axis of said generating gear.

30. A rotatable gear producing tool having a single continuous thread with an abrasive spiral surface, said surface being disposed along the envelope of successive positions of a curved surface of revolution rotated about an axis other than its own while said axis is rotating relative to the tool about the axis of rotation of the tool in constant angular velocity relationship with the rotation about the first-mentioned axis, the curved surface of revolution representing a tooth surface of a generating gear and said first-mentioned axis representing the axis of said generating gear.

31. A rotatable cutter for gear tooth surfaces, said cutter having a single spiral thread provided with cutting edges disposed along a spiral surface that is the envelope of successive positions of a curved surface of revolution rotated about an axis other than its own while said axis is rotating relative to the cutter about the axis of rotation of the cutter in constant angular velocity relationship with the rotation about the first-mentioned axis, the curved surface of revolution representing a tooth surface of a generating gear and said first-mentioned axis representing the axis of said generating gear.

References Cited in the file of this patent

UNITED STATES PATENTS

| | | |
|---|---|---|
| 1,364,056 | Farnum | Dec. 28, 1920 |
| 1,608,367 | Buckingham | Nov. 23, 1926 |
| 1,689,566 | Trbojevich | Oct. 30, 1928 |
| 1,775,677 | Herrmann | Aug. 19, 1930 |
| 1,815,336 | Shlesinger et al. | July 21, 1931 |
| 2,063,492 | De Leeuw | Dec. 8, 1936 |
| 2,070,191 | Wildhaber | Feb. 9, 1937 |
| 2,234,382 | Newman | Mar. 11, 1941 |
| 2,339,375 | Cassel | Jan. 18, 1944 |
| 2,347,283 | Ross | Apr. 25, 1944 |
| 2,424,271 | Gallaway | July 22, 1947 |
| 2,456,762 | Wilson | Dec. 21, 1948 |
| 2,475,902 | Klamp | July 12, 1949 |
| 2,482,785 | Lohutko | Sept. 27, 1949 |
| 2,561,004 | Wilson et al. | July 17, 1951 |